United States Patent
Su et al.

(10) Patent No.: US 12,549,509 B2
(45) Date of Patent: Feb. 10, 2026

(54) TRAFFIC SCHEDULING METHOD, APPARATUS AND SYSTEM, TERMINAL DEVICE AND READABLE STORAGE MEDIUM

(71) Applicant: BEIJING YOUZHUJU NETWORK TECHNOLOGY CO., LTD., Beijing (CN)

(72) Inventors: Jie Su, Beijing (CN); Kaiyu Zheng, Beijing (CN); Xue Liu, Beijing (CN); Jieke Wu, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 18/474,084

(22) Filed: Sep. 25, 2023

(65) Prior Publication Data
US 2024/0106793 A1   Mar. 28, 2024

(30) Foreign Application Priority Data

Sep. 26, 2022  (CN) .......................... 202211174488.0

(51) Int. Cl.
*H04L 61/3015* (2022.01)
*H04L 41/0816* (2022.01)
(Continued)

(52) U.S. Cl.
CPC ...... *H04L 61/3025* (2013.01); *H04L 41/0816* (2013.01); *H04L 47/2408* (2013.01); *H04L 61/4511* (2022.05)

(58) Field of Classification Search
CPC ..... H04L 61/35; H04L 61/10; H04L 61/4511; H04L 61/2503; H04L 67/1095; H04L 67/1036; H04L 67/2408; H04L 67/0897
See application file for complete search history.

(56) References Cited

U.S. PATENT DOCUMENTS

2015/0067819 A1* 3/2015 Shribman ............... H04L 67/06
                                                           709/218
2015/0281168 A1* 10/2015 Holloway ........... H04L 61/4511
                                                           709/245
(Continued)

FOREIGN PATENT DOCUMENTS

CN          108769271 A        11/2018
CN          112671664 A  *      4/2021
(Continued)

OTHER PUBLICATIONS

First Office Action for Chinese Application No. 202211174488.0, mailed Feb. 19, 2025, 15 Pages.

*Primary Examiner* — Mahran Y Abu Roumi
(74) *Attorney, Agent, or Firm* — Alleman Hall LLP (57) ABSTRACT

A traffic scheduling method, apparatus and system, a terminal device and a readable storage medium are provided. The method includes: acquiring scheduling configuration information, where the scheduling configuration information indicates a traffic scheduling strategy for a target domain name; modifying the target domain name into a standardized domain name matching the traffic scheduling strategy, in a preset domain naming manner; the standardized domain name at least includes a computer room identifier used to indicate the target computer room after traffic scheduling; and initiating an access request to the target computer room, based on the standardized domain name.

18 Claims, 3 Drawing Sheets

(51) Int. Cl.
*H04L 47/2408* (2022.01)
*H04L 61/4511* (2022.01)

(56) References Cited

U.S. PATENT DOCUMENTS

| | | | | |
|---|---|---|---|---|
| 2019/0222551 A1* | 7/2019 | Chen | ........................ | H04L 61/35 |
| 2020/0074092 A1* | 3/2020 | Fliam | ...................... | H04L 67/02 |
| 2021/0176310 A1* | 6/2021 | Liang | .................. | H04L 41/0668 |
| 2021/0377326 A1* | 12/2021 | Ruan | .................... | H04N 21/64 |
| 2022/0131935 A1* | 4/2022 | Xue | .................... | H04L 67/1095 |
| 2023/0188498 A1* | 6/2023 | Sonwane | .............. | H04W 12/06 |
| | | | | 726/1 |
| 2024/0406136 A1* | 12/2024 | Lv | ........................ | H04L 61/4511 |
| 2024/0406152 A1* | 12/2024 | Wang | .................. | H04L 63/0421 |

FOREIGN PATENT DOCUMENTS

| CN | 114465983 A | 5/2022 |
|---|---|---|
| CN | 115002117 A | 9/2022 |
| WO | 2018113591 A1 | 6/2018 |

\* cited by examiner

TRAFFIC SCHEDULING METHOD, APPARATUS AND SYSTEM, TERMINAL DEVICE AND READABLE STORAGE MEDIUM

This application claims priority to Chinese Patent Application No. 202211174488.0, titled "TRAFFIC SCHEDULING METHOD, APPARATUS AND SYSTEM, TERMINAL DEVICE AND READABLE STORAGE MEDIUM", filed on Sep. 26, 2022 with the China National Intellectual Property Administration, which is incorporated herein by reference in its entirety.

FIELD

The present disclosure relates to the field of Internet technology, and in particular to a traffic scheduling method, a traffic scheduling apparatus, a traffic scheduling system, a terminal device, and a readable storage medium.

BACKGROUND

In the conventional technology, in order to ensure the stability of the data center, multiple computer rooms are usually deployed in different regions to perform redundant backup. In this way, when one of the computer rooms fails, the traffic of this computer room can be directed to other computer rooms, to ensure that the service is not interrupted for a long time.

In the conventional technology, traffic guidance between different computer rooms is usually implemented by adding the IP address of the computer room to the domain name resolution result. For example, the traffic of a certain domain name is directed to the computer room A based on the domain name resolution result. When the computer room A fails, the IP address of the computer room B can be added to the above domain name resolution result, to guide the traffic of computer room A to the computer room B. In this way, the traffic of this domain name can be directed to the computer room B.

However, in the conventional technology, the domain name resolution result in the domain name resolution server needs to be changed, which is often not immediately effective. As a result, after the fault occurs for a period of time, the traffic can be directed to the variable computer room, which may reduce the reliability of the service.

SUMMARY

In view of this, a traffic scheduling method, a traffic scheduling apparatus, a traffic scheduling system, a terminal device, and a readable storage medium are provided according to one or more embodiments of the present disclosure, which can improve the reliability of the service.

In one aspect, a traffic scheduling method is provided according to the present disclosure. The method includes: acquiring scheduling configuration information, where the scheduling configuration information indicates a traffic scheduling strategy for a target domain name; modifying the target domain name into a standardized domain name matching the traffic scheduling strategy, in a preset domain naming manner; where the standardized domain name at least includes a computer room identifier used to indicate a target computer room after traffic scheduling; and initiating an access request to the target computer room, based on the standardized domain name.

In another aspect, a traffic scheduling apparatus is provided according to the present disclosure. The apparatus includes: a configuration information acquiring unit configured to acquire scheduling configuration information, wherein the scheduling configuration information indicates a traffic scheduling strategy for a target domain name; a domain name modifying unit configured to modify the target domain name into a standardized domain name matching the traffic scheduling strategy, in a preset domain naming manner, where the standardized domain name at least includes a computer room identifier used to indicate a target computer room after traffic scheduling; and a request initiating unit configured to initiate an access request to the target computer room based on the standardized domain name.

In another aspect, a traffic scheduling system is provided according to the present disclosure. The system includes: a terminal device; a configuration center; and a scheduling center; where the scheduling center is configured to generate scheduling configuration information, and issue the scheduling configuration information to the configuration center; the configuration center is configured to store the scheduling configuration information issued by the scheduling center; the terminal device is configured to acquire the scheduling configuration information from the configuration center, where the scheduling configuration information indicates a traffic scheduling strategy for a target domain name; modify the target domain name into a standardized domain name matching the traffic scheduling strategy, in a preset domain naming manner, where the standardized domain name at least includes a computer room identifier used to indicate a target computer room after traffic scheduling; and initiate an access request to the target computer room, based on the standardized domain name.

In another aspect, a terminal device is provided according to the present disclosure. The terminal device includes: a memory; and a processor, where the memory is configured to store a computer program, and the computer program, when executed by the processor, implements the traffic scheduling method above.

In another aspect, a computer readable storage medium is provided according to the present disclosure, which stores a computer program thereon; where the computer program, when executed by a processor, implements the traffic scheduling method above.

With the technical solutions according to one or more embodiments of the present disclosure, traffic scheduling may be implemented by means of domain name replacement. When the terminal device needs to initiate an access request, current scheduling configuration information can be acquired, and the scheduling configuration information may indicate the traffic scheduling strategy of the target domain name. According to the traffic scheduling strategy, the terminal device can modify the target domain name to a standardized domain name. The standardized domain name is obtained by rewriting the target domain name in a preset domain naming manner. The standardized domain name may include the computer room identifier for indicating a target computer room after traffic scheduling.

In this way, the terminal device can initiate an access request based on the modified standardized domain name. Since the access request carries the computer room identifier of the target computer room, the access request is eventually received by the target computer room, thereby realizing the function of traffic guidance.

In the technical solutions provided by one or more embodiments of the present disclosure, the domain name may be modified in real time at the terminal device according to the scheduling configuration information. Since it does not involve the change of the domain name resolution result, traffic scheduling can be realized in real time, thereby improving service reliability.

BRIEF DESCRIPTION OF THE DRAWINGS

Hereinafter, features and advantages of the present disclosure are better understood with reference to the accompanying drawings, which are illustrative and should not be construed as limiting the present disclosure in any way, in which.

DETAILED DESCRIPTION OF EMBODIMENTS

In order to clarify the above objects, technical solutions, and advantage of the present disclosure more clearly, hereinafter the technical solutions in the embodiments of the present disclosure are described clearly and thoroughly with reference to the accompanying drawings in the embodiments of the present disclosure. It is apparent that the described embodiments are merely a part of the embodiments of the present disclosure rather than all of them. All other embodiments obtained by those skilled in the art based on the embodiments of the present disclosure, without creative efforts, shall fall within the protection scope of the present disclosure.

According to an embodiment of the present disclosure, a traffic scheduling method is provided, which can be applied to a terminal device. The terminal device may be an electronic device used by a user. For example, the terminal device may be a smart phone, a tablet computer, a personal computer, a smart wearable device, and the like. In addition, the traffic scheduling method may also be applied to an application running in the terminal device. When an application initiates an access request through a terminal device, the domain name can be replaced according to the traffic scheduling method provided in the present disclosure.

In practical applications, in a process of replacing a domain name, in order to ensure that the replacement process and the replaced domain name have a certain degree of standardization, the domain naming manner can be preset. Through the preset domain naming manner, various domain names can be generated in the process of replacing a domain name.

Specifically, the domain name may include an initial domain name, a default domain name, a routing domain name and a standardized domain name. The initial domain name may be an unmodified domain name, which is usually registered by the service provider. The default domain name, routing domain name and standardized domain name may be obtained by modifying the initial domain name according to the preset domain naming manner.

The default domain name may be divided according to the service logic, which is used in the application. The developer of the application usually directly uses the default domain name during the development process. For example, in an application, default domain names may include "api.amemv.com" and "search.amemv.com". In this case, the second-level domain name "amemv.com" may be exclusive to the application, and the third-level domain name may distinguish various service logics. For example, "api" indicates interface call service, and "search" indicates search service, etc.

It should be noted that if a certain service has load balancing services with different seven layer, the service usually needs to set different default domain names, to correctly resolve the traffic of the service to the different seven layer of the load balancing services.

Compared with the default domain name, the routing domain name may add with more fields. These newly added fields may indicate the path selection strategy of the routing domain name. Added fields in the routing domain name may include content delivery network (CDN) identifier, load balancing service identifier, and optional attribute identifier.

The CDN identifier may indicate different network acceleration strategies. For example, the CDN identifier is a string ABC, which may indicate that a cluster named "ABC" is used for network acceleration. For another example, the CDN identifier is a number "100", which may indicate that resources are acquired from the back-to-source host.

The load balancing service identifier may indicate different load balancing clusters. In practical applications, different load balancing services may correspond to different load balancing clusters. By adding the load balancing service identifier to the routing domain name, the current traffic can be directed to the desired load balancing cluster. For example, the load balancing service identifier "normal" may indicate to use a normal load balancing cluster, and the load balancing service identifier "core" indicates to use a core load balancing cluster.

The attribute identifier may be used as an optional field to mark traffic. For example, the attribute identifier "quic" indicates that the current access request corresponds to the network acceleration service; the attribute identifier "v6" indicates that the current access request corresponds to the ipv 6 service. One or more attribute identifiers may be added to one routing domain name, and respective attribute identifiers may be connected by a symbol "-".

In this embodiment, the preset domain naming manner may specify the naming method of the routing domain name. For example, a general form of a routing domain name may be expressed as follows:

[service identifier][CDN identifier]-[load balancing service identifier]-[optional: attribute identifier]·[second-level domain name].

In a practical application example, the default domain name may be "api.amemv.com", and the routing domain name may be expressed as "api100-normal-quic.amemv.com". In the routing domain name, "api" is the service identifier, "100" is the CDN identifier, "normal" is the load balancing service identifier, "quic" is the attribute identifier, and "amemv.com" is the second-level domain name.

In this embodiment, the routing domain name only determines an optimal or user-desired transmission path. In order to guide traffic to the computer room, it is also necessary to add the computer room identifier to the routing domain name to form the final standardized domain name. Thus, the general form of the standardized domain name may be expressed as follows:

[service identifier][CDN identifier]-[load balancing service identifier]-[optional: attribute identifier]-[computer room identifier]·[second-level domain name].

For example, in a specific application example, the standardized domain name generated based on the routing domain name above may be: "api100-normal-quic-xx.amemv.com". In the standardized domain name, "xx" may indicate the computer room identifier.

As described above, for the to-be-accessed original domain name, the application may first establish a mapping relationship from the original domain name to the default domain name, to convert the original domain name into the default domain name. For example, in FIG. 1, the original domain name is "webcast.snssdk.com", and the corresponding default domain name may be "webcast.ttapi.com". Then, according to the actual traffic scheduling instruction, the default domain name may be modified to the routing domain name "webcast 100-wbnormal.ttapi.com", and finally the standardized domain name "webcast 100-wbnormal-xx.ttapi.com" may be obtained by modification.

Figure 1:
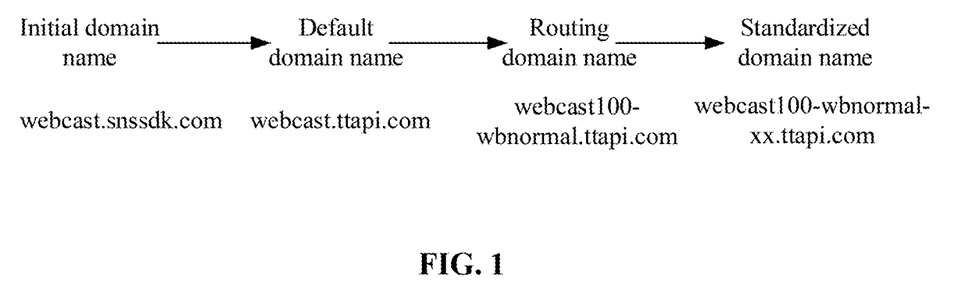
FIG. 1 is a schematic diagram of modification relationships among domain names according to an embodiment of the present disclosure.

In this embodiment, the access request finally sent from the terminal device may be generated based on the standardized domain name.

It should be noted that an address map may be performed on each standardized domain name generated in the present disclosure in the domain name resolution server in advance. In this way, by changing the standardized domain name, the access request can be directed to the corresponding computer room through the normal domain name resolution process.

Figure 2:
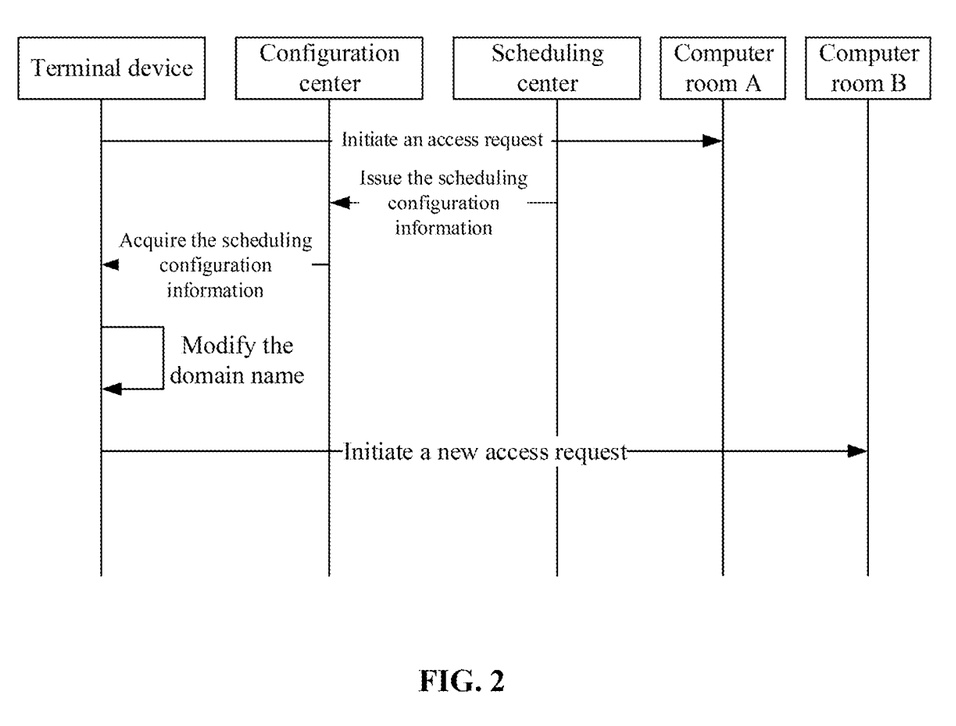
FIG. 2 is a schematic interaction diagram of a traffic scheduling system according to an embodiment of the present disclosure.

On the basis of presetting the domain naming manner, the various domain names above may be applied to the traffic scheduling system as shown in FIG. 2. The traffic scheduling system shown in FIG. 2 may include a terminal device, a configuration center, a scheduling center, and multiple computer rooms. The scheduling center may generate scheduling configuration information for traffic scheduling. The scheduling configuration information may be issued to the configuration center. The configuration center may store the scheduling configuration information issued by the scheduling center. The terminal device may acquire the latest scheduling configuration information from the configuration center, then modify the domain name according to the traffic scheduling strategy defined by the scheduling configuration information, and initiate an access request according to the modified domain name, to direct traffic of the access request to the corresponding computer room.

Figure 3:
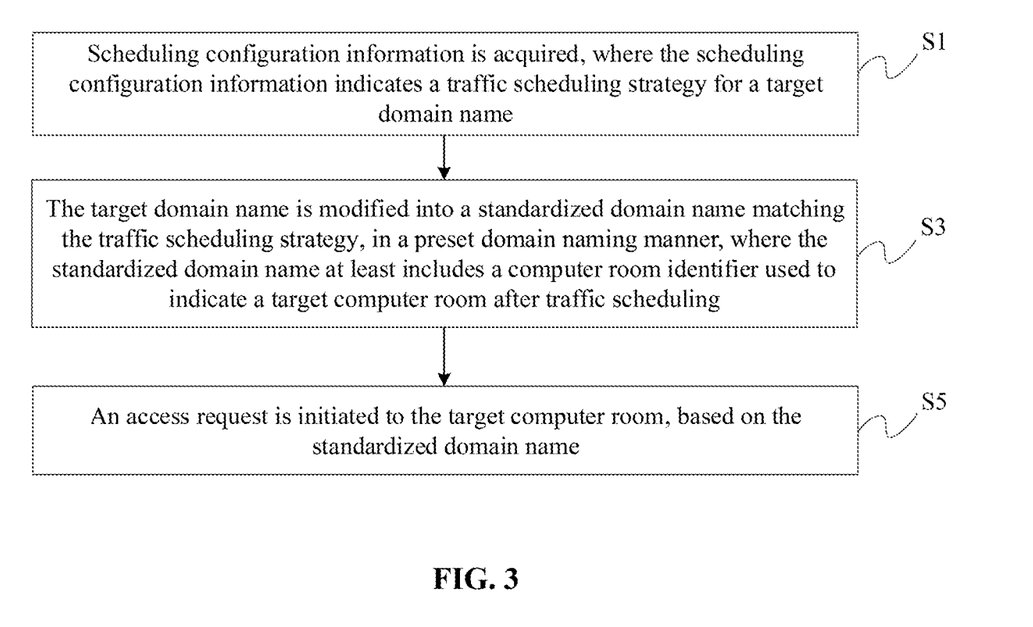
FIG. 3 is a flowchart of a traffic scheduling method according to an embodiment of the present disclosure.

Referring to FIG. 3, on the terminal device side, the traffic scheduling method provided by an embodiment of the present disclosure may include the following multiple steps.

In S1, scheduling configuration information is acquired, where the scheduling configuration information indicates a traffic scheduling strategy for a target domain name.

In this embodiment, the terminal device may, generally, initiate an access request to the corresponding computer room directly according to the original domain name. In the case that the computer room fails, or the network status fluctuates, or traffic scheduling is currently required, the latest scheduling configuration information may be acquired from the configuration center. Subsequently, the domain name may be modified according to the traffic scheduling strategy in the scheduling configuration information.

Specifically, the scheduling configuration information may indicate a traffic scheduling strategy for a target domain name. In addition, the scheduling configuration information may further include traffic scheduling strategies for other domain names. Hereinafter, the target domain name is used as an example to explain the technical solution of this embodiment, which does not indicate that the scheduling configuration information only includes the traffic scheduling strategy for the target domain name. The target domain name may be a default domain name obtained by mapping the original domain name. The terminal device modifies the default domain name to obtain a final standardized domain name.

In this embodiment, the traffic scheduling strategy for the target domain name may include route selection information and computer room selection information for the target domain name. The route selection information may include, for example, the above-mentioned CDN identifier, load balancing service identifier and attribute identifier. The computer room selection information may include a computer room identifier. When there are multiple computer room identifiers, the computer room selection information may further include the traffic distribution ratio of respective computer rooms.

In an embodiment, the timing for the terminal device acquiring the scheduling configuration information may include multiple situations. For example, the terminal device may actively monitor an abnormal response ratio of the initiated access requests. When the abnormal response rate is too high, it indicates that the computer room occurs faulty, or the network status of the current path fluctuates. In this case, the terminal device may load the latest scheduling configuration information from the configuration center.

Specifically, for the initiated access requests, the terminal device may count a ratio of an access request with an abnormal response to all access requests, and acquire scheduling configuration information when the ratio is greater than or equal to a specified ratio threshold. The specified ratio threshold may be a threshold calculated according to history data or may be a threshold flexibly selected according to a practical application scenario.

In addition, after the scheduling center generates new scheduling configuration information and issues the new scheduling configuration information to the configuration center, the scheduling center can notify the terminal device through probe information. In this way, when the terminal device receives the probe information indicating the configuration version number, it can be determined whether the configuration version number indicated by the probe information is consistent with the locally stored configuration version number. If the configuration version number indicated by the probe information is inconsistent with the locally stored configuration version number, it indicates that new scheduling configuration information is currently generated. In this case, the terminal device may acquire the scheduling configuration information from the configuration center.

In practical applications, the probe information may be a group of serial numbers related to time. The serial numbers may include, for example, information such as year, month, day, hour, minute, and second. In order to ensure uniqueness of the probe information, the probe information may further include finer-grained information. After the new scheduling configuration information is generated, the moment when the scheduling configuration information is generated may be used as the probe information. In this way, the probe information may indicate the configuration version number of the scheduling configuration information.

After receiving the probe information sent by the scheduling center, the terminal device may determine whether the locally stored probe information is behind the probe information sent by the scheduling center. If the locally stored probe information is behind the probe information sent by the scheduling center, it indicates that the scheduling configuration information has been updated. In this case, the terminal device may pull the latest scheduling configuration information from the configuration center.

In one embodiment, since there may be the large number of terminal devices, if the terminal devices pull the scheduling configuration information from the configuration center at the same time, the load on the configuration center may be too high. In this case, when the terminal device determines that the configuration version number indicated by the probe information is inconsistent with the locally stored configuration version number, a random duration may be generated. The random duration may be, for example, between 0 and 60 seconds. Then, after waiting for the random duration, the terminal device acquires the scheduling configuration information from the configuration center. In this way, the large number of terminal devices may acquire the scheduling configuration information from the configuration center at dispersed time points, thereby reducing the load on the configuration center.

In S3, according to a preset domain naming manner, the target domain name is modified into a standardized domain name matching the traffic scheduling strategy, where the standardized domain name at least includes a computer room identifier used to indicate the target computer room after traffic scheduling.

In this embodiment, after acquiring the scheduling configuration information, the target domain name may be modified according to the route selection information and computer room selection information in the traffic scheduling strategy, so as to obtain the standardized domain name that matches the traffic scheduling strategy. The details of the modifying method can refer to the process of modifying the default domain name into a routing domain name and modifying the routing domain name to the standardized domain name described above.

It is taken the target domain name as an example. When the target domain name is modified into a standardized domain name that matches the traffic scheduling strategy, the computer room identifier of the target computer room after traffic scheduling may be identified from the traffic scheduling strategy, and an adding position of the computer room identifier in the target domain name is determined according to the preset domain naming manner. For example, the adding location may be behind the attribute identifier. In the case of no attribute identifier, the adding location is behind the load balancing service identifier. At the adding position of the target domain name, the computer room identifier may be added to generate the standardized domain name matching the traffic scheduling strategy.

The generated standardized domain name may contain the computer room identifier of the target computer room, so that the access request initiated based on the standardized domain name is finally directed to the target computer room.

In S5, an access request to the target computer room is initiated based on the standardized domain name.

In this embodiment, after obtaining the standardized domain name, the terminal device may initiate an access request according to the standardized domain name. By performing domain name resolution on the standardized domain name, the access request is eventually received by the target computer room, thereby directing the traffic of the access request to the target computer room.

With the technical solution according to one or more embodiments of the present disclosure, traffic scheduling can be implemented by means of domain name replacement. When the terminal device needs to initiate an access request, the current scheduling configuration information can be acquired, and the scheduling configuration information may indicate the traffic scheduling strategy of the target domain name. The terminal device may modify the target domain name to the standardized domain name, in the traffic scheduling strategy. The standardized domain name is obtained, by rewriting the target domain name according to a preset domain naming manner. The standardized domain name may include a computer room identifier indicating a target computer room after traffic scheduling.

In this way, the terminal device may initiate an access request based on the modified standardized domain name. Since the access request carries the computer room identifier of the target computer room, the access request is eventually received by the target computer room, thereby realizing the function of traffic guidance.

In the technical solutions provided by one or more embodiments of the present disclosure, the domain name may be modified in real time at the terminal device according to the scheduling configuration information. Since it does not involve the change of the domain name resolution result, traffic scheduling can be realized in real time, thereby improving service reliability.

In the traffic scheduling method implemented in each of the aforementioned embodiments, different traffic scheduling strategies may be set for different domain names through the scheduling configuration information. Then, the domain name may be modified and replaced to guide the traffic of the domain name to the corresponding computer room. However, in some practical application scenarios, it may be necessary to perform batch traffic scheduling on domain names of certain service types at the same time. Thus, in the traffic scheduling process, it may also be necessary to flexibly select traffic scheduling strategies according to the area information of the user who initiates the access request.

In view of this, in an embodiment of the present disclosure, a domain name group and a condition group may be set in the scheduling configuration information, to realize the traffic scheduling function more flexibly.

Currently, for an application, if it is necessary to perform traffic scheduling for each domain name involved in the application, then one or more domain name groups may be set for the application. One domain name group may include one or more domain names in the same service type. For example, the domain names related to the search service in the application are "www.search.com" and "www.search_video.com". Thus, a domain name group "search" may be created for the search service, and the domain name group "search" may contain the above two domain names. Similarly, domain name groups corresponding to other service types may also be created.

It should be noted that in some scenarios, a default domain name group may be created. In the default domain name group, domain names without defined service types may be recorded, or domain names with defined service types but without creating domain name group for those service types may be recorded. For example, in the application, only two domain name groups, i.e., a search domain name group and a video domain name group, may be created, and then other domain names may be collectively categorized into the default domain name group. The purpose of this setting is to ensure that each domain name matches with a domain name group when domain name matching is performed subsequently.

In this embodiment, a condition group corresponding to the domain name group may be generated. The condition group may include one or more traffic scheduling strategies associated with domain names in the domain name group. In this way, all domain names in the domain name group can follow the traffic scheduling strategies in the conditional group, thereby realizing batch scheduling of domain names.

As an example, for the video domain name group in the application, the traffic scheduling strategy in the corresponding condition group is that the traffic distribution ratio of the computer room A to the computer room B is 1:1. In this way, the traffic of each domain name in the video domain name group is finally allocated to the computer room A and the computer room B in the same ratio according to the traffic scheduling strategy in the condition group.

By setting a domain name group and associating a corresponding condition group with the domain name group, batch scheduling of domain names can be realized, which improves the flexibility of traffic scheduling.

In this embodiment, it is taken the target domain name as an example. In a process of determining the traffic scheduling strategy of the target domain name, the target domain name group including the target domain name may be determined according to the service type of the target domain name, and the traffic scheduling strategy in the condition group corresponding to the target domain name group is used as the traffic scheduling strategy of the target domain name.

In a specific application example, for domain names in a domain name group, scheduling traffic may also be required to consider area information of the user who initiates the access request. The access requests to the same domain name which are initiated by the users in different areas may be scheduled to different computer rooms. For example, for the domain name "www.search.com", in order to improve access efficiency, traffic for the user in the area A and traffic for the user in the area B need to be directed to different computer rooms. In this case, the traffic scheduling strategy in the condition group needs to introduce more limited information.

Figure 4:
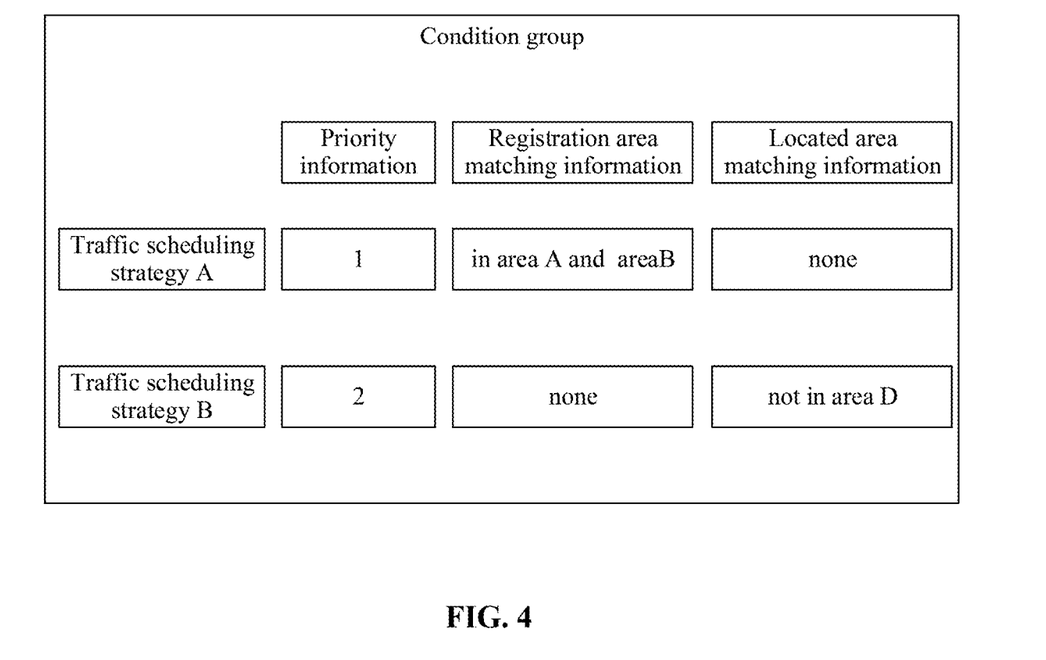
FIG. 4 is a schematic diagram of a condition group according to an embodiment of the present disclosure.

In an embodiment, each traffic scheduling strategy in the condition group may further include priority information and area matching information. The priority information may indicate a priority of the traffic scheduling strategy, and the area matching information may indicate the area information to which the traffic scheduling strategy is adapted.

Referring to FIG. 4, each of the two traffic scheduling strategies in the condition group includes priority information, registration area matching information, and located area matching information. For the traffic scheduling strategy with the priority information of 1, the registration area matching information is "in area A and area B", the located area matching information is none, which indicates that the traffic scheduling strategy is applicable to users whose registration area is in area A or area B. For the traffic scheduling strategy with priority information of 2, the registration area matching information is none, and the located area matching information is "not in area D", which indicates that the traffic scheduling strategy is applicable to the user whose is not located in area D.

By the area matching information, the registration area and/or the located area of the user who initiates the access request may be limited.

In the case that a certain user can match multiple traffic scheduling strategies, the traffic scheduling of the access request may be performed according to the traffic scheduling strategy with the highest priority information.

Specifically, it is taken the target domain name as an example again. In the process of determining the traffic scheduling strategy of the target domain name, the target domain name group including the target domain name may be determined, and the target condition group corresponding to the target domain name group may be acquired. Then, current area information of the initiator of the target domain name may be identified. The current area information includes the registration area information and the located area information of the initiator. After the current area information of the initiator is identified, candidate traffic scheduling strategies with the area matching information matching the current area information may be selected from the traffic scheduling strategies in the target condition group. Finally, the traffic scheduling strategy of the target domain name may be determined from the candidate traffic scheduling strategies according to the priority information.

It should be noted that the condition group usually includes a default traffic scheduling strategy. The default traffic scheduling strategy may have priority information indicating the lowest priority. In the default traffic scheduling strategy, the area information is usually not restricted (i.e., the area matching information is none). The purpose of this setting is to ensure that all users who initiate access requests can apply to the default traffic scheduling strategy. When no traffic scheduling strategy with the higher priority information can be used, the access request of user can be scheduled according to the default traffic scheduling strategy, which ensures the feasibility of traffic scheduling.

In one embodiment, besides the above priority information and area matching information, the traffic scheduling strategy may further include a computer room identifier. Only one computer room identifier in the traffic scheduling strategy indicates that all traffic is scheduled to the computer room indicated by the computer room identifier. However, in the case that the traffic scheduling strategy includes multiple computer room identifiers, the traffic distribution ratio of the multiple computer room identifiers are usually marked. For example, a traffic scheduling strategy includes two computer room identifiers: computer room A and computer room B, and the traffic distribution ratio of these two computer rooms is 3:7. Then, in a process of scheduling the access request initiated by the user, it is necessary to determine which computer room the access request should be scheduled to, so that the computer room identifier of this computer room can be added to the domain name.

In this embodiment, it is taken the target domain name as an example. In the case of multiple to-be-scheduled computer rooms defined by the traffic scheduling strategy corresponding to the target domain name, the user identifier of the initiator of the target domain name may be obtained. Generally, the user identifier may be a unique number. By performing a modulo operation on the user identifier, a corresponding modulo value may be generated. For example, if the user identifier is 11, a modulo value of 1 is obtained by taking the user identifier modulo 10. Then, the traffic distribution ratio of multiple to-be-scheduled computer rooms may be identified from the traffic scheduling strategy. Subsequently, the target computer room after traffic scheduling may be determined from the multiple to-be-scheduled computer rooms according to the modulo value and the traffic distribution ratio.

Specifically, when the traffic distribution ratio is 3:7, access requests initiated by users with the modulo values of 0 to 2 may be scheduled to computer room A; and access requests initiated by users with the modulo values of 3 to 9 may be scheduled to computer room B. In this way, by calculating the modulo value, traffic may be scheduled among multiple computer rooms according to the traffic distribution ratio defined by the traffic scheduling strategy.

After the target computer room after traffic scheduling is determined from multiple to-be-scheduled computer rooms, the computer room identifier of the target computer room may be added to the target domain name, to form a standardized domain name.

In some specific application scenarios, considering that the terminal device initiates an access request in the form of a persistent connection, even if the terminal device acquires the scheduling configuration information from the configuration center, since the terminal device maintains a persistent connection with the original computer room, the terminal device still cannot implement the scheduling configuration information.

In view of this, in one embodiment, when providing the scheduling configuration information to the terminal device, the configuration center may also issue the persistent connection disconnection configuration information to the terminal device. In this way, before the scheduling configuration information is acquired, if the terminal device has an access request initiated through a persistent connection, then the persistent connection disconnection configuration information issued by the configuration center can be received when the scheduling configuration information is acquired. In the case that the access request initiated through the persistent connection matches the persistent connection disconnection configuration information, the terminal device may actively disconnect the persistent connection. After the persistent connection is disconnected, the terminal device may follow the traffic scheduling strategy in the schedule configuration information to modify the domain name.

In this embodiment, the access request initiated through the persistent connection usually includes a persistent connection domain name and a request path. For example, the uniform resource locator (URL) of a certain access request is "www.search.com/v1/search", in which "www.search.com" may be a persistent connection domain name, and "v1/search" may be the request path. Then, the persistent connection disconnection configuration information issued by the configuration center needs to include domain name matching information and path matching information. Only when the persistent connection domain name matches the domain name matching information and the request path matches the path matching information, it indicates that the access request initiated through the persistent connection manner matches the persistent connection disconnection configuration information.

In a practical application, a part of the persistent connection disconnection configuration information may be as follows:

```
"host_blacklist" :[
    "frontier.snssdk.com"
],
"path_blacklist":[
    "/ ws /v2"
]
```

In the part of the persistent connection disconnection configuration information, the "host_blacklist" may represent the domain name matching information, "frontier.snssdk.com" is a to-be-matched persistent connection domain name; "path_blacklist" may represent the path matching information, and "/ws/v2" is the to-be-matched request path.

In practical applications, the matching process of the persistent connection domain name and the request path can support the matching of wildcards (e.g., symbols * and symbols ?) according to the conventional technology of character matching, which will not be repeated herein.

With the technical solutions of one or more embodiments of the present disclosure, the attribute identifier can function as identifying traffic. By further using the attribute identifier in the subsequent process, traffic with certain attributes can be monitored, so as to realize the functions of traffic positioning and traffic statistics.

In addition, the above solutions of setting one or more domain name groups for the application in the present disclosure can further be extended to scenarios for multiple applications. For example, multiple applications may be formed into an application group. Then, one or more domain name groups may be created for the application group, so as to realize the function of batch scheduling of multiple domain names in multiple applications.

In the technical solutions of the present disclosure, it can flexibly generate corresponding standardized domain names in the traffic scheduling process by standardizing the naming manner of standardized domain names and other intermediate domain names (e.g., route selection domain names and default domain names). In this way, the traffic can be scheduled in real time without modifying the content in the domain name resolution server, which significantly improves the reliability of the traffic scheduling service.

Figure 5:
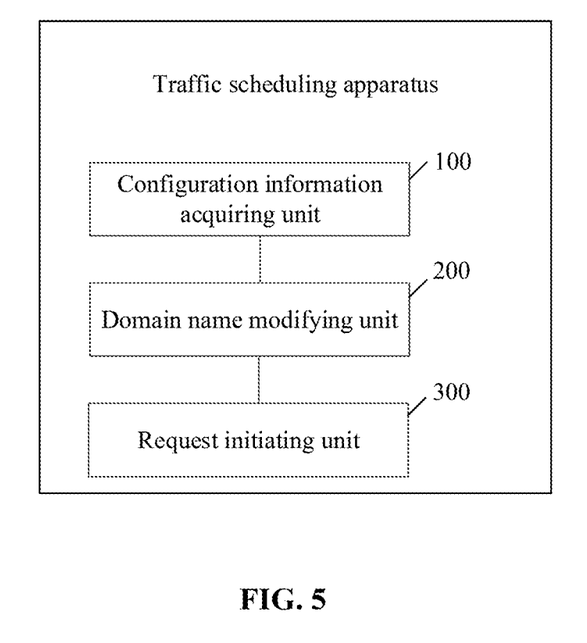
FIG. 5 is a schematic diagram of functional modules of a traffic scheduling apparatus according to an embodiment of the present disclosure.

Referring to FIG. 5, a traffic scheduling apparatus is provided according to the present disclosure. The traffic scheduling apparatus includes as follows.

A configuration information acquiring unit 100 is configured to acquire scheduling configuration information, where the scheduling configuration information indicates a traffic scheduling strategy for a target domain name.

A domain name modifying unit 200 is configured to modify the target domain name into a standardized domain name matching the traffic scheduling strategy, in a preset domain name naming manner, where the standardized domain name at least includes a computer room identifier used to indicate a target computer room after traffic scheduling.

A request initiating unit 300 is configured to initiate an access request to the target computer room based on the standardized domain name.

In one embodiment, the configuration information acquiring unit 100 is further configured to determine a ratio of an access request with an abnormal response for the initiated access request; and acquire the scheduling configuration information in a case that the ratio is greater than or equal to a specified ratio threshold; or in a case that probe information indicating a configuration version number is received, determine whether a configuration version number indicated by probe information is consistent with a configuration version number stored locally, and acquire the scheduling configuration information in a case that the configuration version number indicated by the probe information is inconsistent with the configuration version number stored locally.

In one embodiment, the configuration information acquiring unit 100 is further configured to generate a random duration and acquire the scheduling configuration information after waiting for the random duration, in the case that the configuration version number indicated by the probe information is inconsistent with the configuration version number stored locally.

In one embodiment, the scheduling configuration information includes a domain name group and a condition group corresponding to the domain name group, where the domain name group includes at least one domain name that pertains to a same service type, the condition group includes at least one traffic scheduling strategy associated with the domain name in the domain name group.

In one embodiment, the apparatus further includes: a strategy determination unit configured to determine a target domain name group including the target domain name, according to a service type of the target domain name; and determine the traffic scheduling strategy in the condition group corresponding to the target domain name group as the traffic scheduling strategy of the target domain name.

In one embodiment, the traffic scheduling strategy in the condition group includes priority information and area matching information; the strategy determination unit is further configured to determine a target domain name group including the target domain name, and acquire a target condition group corresponding to the target domain name group; identify current area information of an initiator of the target domain name, and select candidate traffic scheduling strategies with area matching information matching the current area information, from the traffic scheduling strategies included in the target condition group; and determine the traffic scheduling strategy for the target domain name from the candidate traffic scheduling strategies, according to the priority information.

In one embodiment, the domain name modifying unit 200 is further configured to identify the computer room identifier of the target computer room after traffic scheduling from the traffic scheduling strategy, and determine an adding position of the computer room identifier in the target domain name from the preset domain naming manner; and add the computer room identifier at the adding position of the target domain name to generate the standardized domain name matching the traffic scheduling strategy.

In one embodiment, the domain name modifying unit 200 is further configured to acquire a user identifier of an initiator of the target domain name in a case that there are multiple to-be-scheduled computer rooms defined by the traffic scheduling strategy, perform a modulo operation on the user identifier to generate a modulo value; identify a traffic distribution ratio of the multiple to-be-scheduled computer rooms from the traffic scheduling strategy, and determine the target computer room after traffic scheduling from the multiple to-be-scheduled computer rooms according to the modulo value and the traffic distribution ratio.

In one embodiment, in a case that there is an access request initiated through a persistent connection manner before the scheduling configuration information is acquired, the configuration information acquiring unit 100 is further configured to receive persistent connection disconnection configuration information; and disconnect the persistent connection, in a case that the access request initiated through the persistent connection manner matches the persistent connection disconnection configuration information.

In one embodiment, the persistent connection disconnection configuration information includes domain name matching information and path matching information, and the access request initiated through the persistent connection manner includes a persistent connection domain name and a request path; the access request initiated through the persistent connection manner matching the persistent connection disconnection configuration information includes: the persistent connection domain name matching the domain name matching information, and the request path matching the path matching information.

Each unit described in the above embodiments may specifically be implemented by a computer chip, or by a product with a certain function. A typical implementing device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, when describing the above device, functions are divided into various units and described separately. It is apparent that the functions of each unit can be implemented in one or more pieces of software and/or hardware when implementing the present disclosure.

Referring to FIG. 2, a traffic scheduling system is further provided according to the present disclosure. The traffic scheduling system includes a terminal device, a configuration center and a scheduling center.

The scheduling center is configured to generate scheduling configuration information, and issue the scheduling configuration information to the configuration center.

The configuration center is configured to store the scheduling configuration information issued by the scheduling center.

The terminal device is configured to acquire the scheduling configuration information from the configuration center, where the scheduling configuration information indicates a traffic scheduling strategy for a target domain name; modify the target domain name into a standardized domain name matching the traffic scheduling strategy, in a preset domain naming manner; where the standardized domain name at least includes a computer room identifier used to indicate a target computer room after traffic scheduling; and initiate an access request to the target computer room, based on the standardized domain name.

Figure 6:
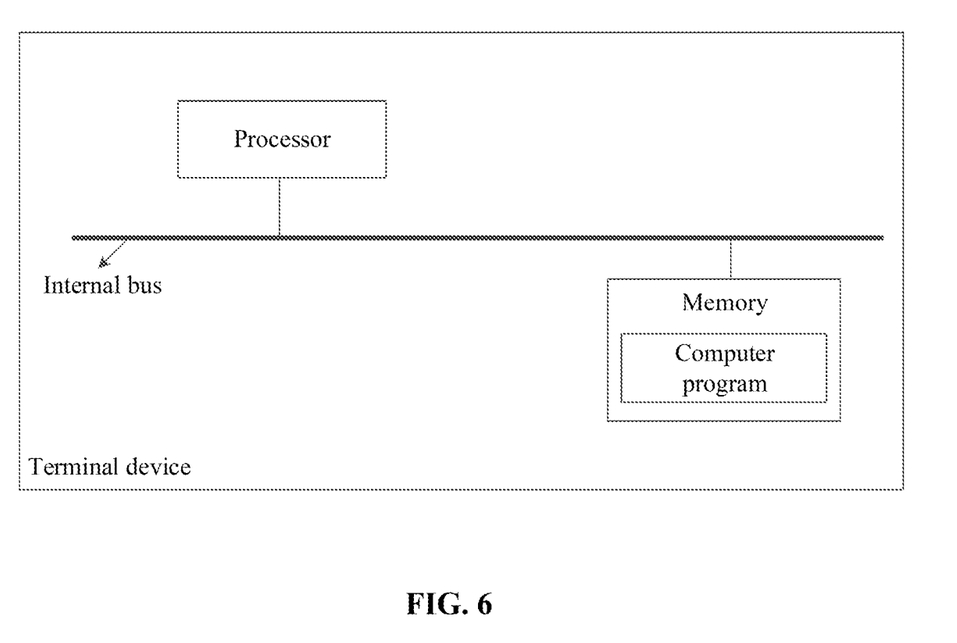
FIG. 6 is a schematic structural diagram of a terminal device according to an embodiment of the present disclosure.

Referring to FIG. 6, a terminal device is further provided according to the present disclosure. The terminal device includes a memory and a processor. The memory is configured to store a computer program, and the computer program, when executed by the processor, implements the traffic scheduling method above.

Further, a computer readable storage medium is provided according to the present disclosure. The computer-readable storage medium is configured to store a computer program. The computer program, when executed by a processor, implements the above traffic scheduling method.

The processor may be a central processing unit (CPU). The processor may also be other general-purpose processor, a digital signal processor (DSP), an application specific integrated circuit (ASIC), a field-programmable gate array (FPGA) or other programmable logic device, a discrete gate or transistor logic device, a discrete hardware component and other chip, or a combination of the above-mentioned types of chips.

As a non-transitory computer readable storage medium, the memory may be used to store non-transitory software programs, non-transitory computer executable programs and modules, such as program instructions/modules corresponding to the methods in the embodiments of the present disclosure. The processor implements various functional applications and data processing of the processor by running the non-transitory software programs, instructions, and modules stored in the memory, that is, implements the methods in the above method implementation.

The memory may include a program storage area and a data storage area, wherein the program storage area may store an operating system and an application program required by at least one function; the data storage area may store data created by the processor, and the like. In addition, the memory may include high-speed random access memory, and may also include non-transitory memory, such as at least one magnetic disk storage device, flash memory device, or other non-transitory solid-state storage device. In some embodiments, the memory may optionally include memory located remotely from the processor, and such remote memory may be connected to the processor via a network. Examples of the aforementioned networks include, but are not limited to, the Internet, intranet, local area network, mobile communication network, and a combination thereof.

Those skilled in the art can understand that all or part of the processes in the methods of the above-mentioned embodiments can be completed by instructing related hardware through computer programs, and the programs can be stored in a computer readable storage medium. During execution, it may include the processes of the embodiments of the above-mentioned methods. Wherein, the storage medium may be a magnetic disk, an optical disk, a read-only memory (ROM), a random access memory (RAM), a flash memory, a hard disk drive (HDD) or solid-state drive (SSD), etc.; the storage medium may also include a combination of the above types of memory.

Each embodiment in this specification is described in a progressive manner, the same and similar parts of each embodiment can be referred to each other, and each embodiment focuses on the differences from other embodiments. In particular, for the embodiments of the device, system, device, and storage medium, since they are basically similar to the method embodiments, the descriptions are relatively simple, and the relevant parts can refer to part of the description of the method embodiments.

The above descriptions are only examples of the present disclosure, which are not intended to limit the present disclosure. For those skilled in the art, there may have various modifications and changes in the present disclosure. Any modification, equivalent replacement, improvement and the like made within the spirit and principle of the present disclosure shall be included within the scope of the claims of the present disclosure.

Although the present disclosure have been described in conjunction with the drawings, those skilled in the art can make various modifications and variations without departing from the spirit and scope of the present disclosure, such modifications and variations all fall within the scope defined by the appended claims.

The invention claimed is:

1. A traffic scheduling method, comprising:
acquiring scheduling configuration information, wherein the scheduling configuration information indicates a traffic scheduling strategy for a target domain name, wherein the scheduling configuration information comprises a domain name group and a condition group corresponding to the domain name group, wherein the domain name group comprises at least one domain name that pertains to a same service type, and the condition group comprises at least one traffic scheduling strategy associated with the domain name in the domain name group;
modifying the target domain name into a standardized domain name matching the traffic scheduling strategy, in a preset domain naming manner, wherein the standardized domain name at least comprises a computer room identifier used to indicate a target computer room after traffic scheduling; and
initiating an access request to the target computer room, based on the standardized domain name.

2. The method according to claim 1, wherein the acquiring the scheduling configuration information comprises:
for the initiated access request, determining a ratio of an access request with an abnormal response to all access requests; and acquiring the scheduling configuration information in a case that the ratio is greater than or equal to a specified ratio threshold; or
in a case that probe information indicating a configuration version number is received, determining whether the configuration version number indicated by the probe information is consistent with a configuration version number stored locally; and acquiring the scheduling configuration information in a case that the configuration version number indicated by the probe information is inconsistent with the configuration version number stored locally.

3. The method according to claim 2, further comprising:
generating a random duration and acquiring the scheduling configuration information after waiting for the random duration, in the case that the configuration version number indicated by the probe information is inconsistent with the configuration version number stored locally.

4. The method according to claim 1, wherein the traffic scheduling strategy for the target domain name is determined by:
determining a target domain name group comprising the target domain name, according to a service type of the target domain name; and determining the traffic scheduling strategy in the condition group corresponding to the target domain name group as the traffic scheduling strategy of the target domain name.

5. The method according to claim 1, wherein the traffic scheduling strategy in the condition group comprises priority information and area matching information; and
the traffic scheduling strategy for the target domain name is determined by:
determining a target domain name group comprising the target domain name, and acquiring a target condition group corresponding to the target domain name group;
identifying current area information of an initiator of the target domain name, and selecting candidate traffic scheduling strategy with the area matching information matching the current area information, from the traffic scheduling strategy comprised in the target condition group; and
determining the traffic scheduling strategy for the target domain name from the candidate traffic scheduling strategy, according to the priority information.

6. The method according to claim 1, wherein the modifying the target domain name into the standardized domain name matching the traffic scheduling strategy comprises:
identifying the computer room identifier of the target computer room after traffic scheduling from the traffic scheduling strategy, and determining an adding position of the computer room identifier in the target domain name from the preset domain naming manner; and adding the computer room identifier at the adding position of the target domain name to generate the standardized domain name matching the traffic scheduling strategy.

7. The method according to claim 1, wherein the target computer room after traffic scheduling is identified by:

in a case that there are a plurality of to-be-scheduled computer rooms defined by the traffic scheduling strategy, acquiring a user identifier of an initiator of the target domain name, and performing a modulo operation on the user identifier to generate a modulo value;

identifying a traffic distribution ratio of the plurality of to-be-scheduled computer rooms from the traffic scheduling strategy, and determining the target computer room after traffic scheduling from the plurality of to-be-scheduled computer rooms according to the modulo value and the traffic distribution ratio.

8. The method according to claim 1, wherein in a case that there is an access request initiated through a persistent connection manner before the scheduling configuration information is acquired, the acquiring the scheduling configuration information further comprises:

receiving persistent connection disconnection configuration information; and disconnecting the persistent connection, in a case that the access request initiated through the persistent connection manner matches the persistent connection disconnection configuration information.

9. The method according to claim 8, wherein the persistent connection disconnection configuration information comprises domain name matching information and path matching information, and the access request initiated through the persistent connection comprises a persistent connection domain name and a request path; and the access request initiated through the persistent connection matching the persistent connection disconnection configuration information comprises:

the persistent connection domain name matching the domain name matching information, and the request path matching the path matching information.

10. A terminal device, comprising:

a memory; and a processor;

wherein the memory is configured to store a computer program, and the computer program, when executed by the processor, causes the processor to:

acquire scheduling configuration information, wherein the scheduling configuration information indicates a traffic scheduling strategy for a target domain name, wherein the scheduling configuration information comprises a domain name group and a condition group corresponding to the domain name group, wherein the domain name group comprises at least one domain name that pertains to a same service type, and the condition group comprises at least one traffic scheduling strategy associated with the domain name in the domain name group;

modify the target domain name into a standardized domain name matching the traffic scheduling strategy, in a preset domain naming manner, wherein the standardized domain name at least comprises a computer room identifier used to indicate a target computer room after traffic scheduling; and initiate an access request to the target computer room, based on the standardized domain name.

11. The terminal device according to claim 10, wherein the computer program, when executed by the processor, cause the processor to:

for the initiated access request, determine a ratio of an access request with an abnormal response to all access requests; and acquire the scheduling configuration information in a case that the ratio is greater than or equal to a specified ratio threshold; or in a case that probe information indicating a configuration version number is received, determine whether the configuration version number indicated by the probe information is consistent with a configuration version number stored locally; and acquire the scheduling configuration information in a case that the configuration version number indicated by the probe information is inconsistent with the configuration version number stored locally.

12. The terminal device according to claim 11, wherein the computer program, when executed by the processor, cause the processor to:

generate a random duration and acquire the scheduling configuration information after waiting for the random duration, in the case that the configuration version number indicated by the probe information is inconsistent with the configuration version number stored locally.

13. The terminal device according to claim 10, wherein the traffic scheduling strategy for the target domain name is determined by:

determining a target domain name group comprising the target domain name, according to a service type of the target domain name; and determining the traffic scheduling strategy in the condition group corresponding to the target domain name group as the traffic scheduling strategy of the target domain name.

14. The terminal device according to claim 10, wherein the traffic scheduling strategy in the condition group comprises priority information and area matching information; and the traffic scheduling strategy for the target domain name is determined by:

determining a target domain name group comprising the target domain name, and acquiring a target condition group corresponding to the target domain name group;

identifying current area information of an initiator of the target domain name, and selecting candidate traffic scheduling strategy with the area matching information matching the current area information, from the traffic scheduling strategy comprised in the target condition group; and determining the traffic scheduling strategy for the target domain name from the candidate traffic scheduling strategy, according to the priority information.

15. The terminal device according to claim 10, wherein the computer program, when executed by the processor, cause the processor to:

identify the computer room identifier of the target computer room after traffic scheduling from the traffic scheduling strategy, and determine an adding position of the computer room identifier in the target domain name from the preset domain naming manner; and add the computer room identifier at the adding position of the target domain name to generate the standardized domain name matching the traffic scheduling strategy.

16. The terminal device according to claim 10, wherein the target computer room after traffic scheduling is identified by:
  in a case that there are a plurality of to-be-scheduled computer rooms defined by the traffic scheduling strategy, acquiring a user identifier of an initiator of the target domain name, and performing a modulo operation on the user identifier to generate a modulo value;
  identifying a traffic distribution ratio of the plurality of to-be-scheduled computer rooms from the traffic scheduling strategy, and determining the target computer room after traffic scheduling from the plurality of to-be-scheduled computer rooms according to the modulo value and the traffic distribution ratio.

17. The terminal device according to claim 10, wherein in a case that there is an access request initiated through a persistent connection manner before the scheduling configuration information is acquired, the computer program, when executed by the processor, cause the processor to:
  receive persistent connection disconnection configuration information; and disconnect the persistent connection, in a case that the access request initiated through the persistent connection manner matches the persistent connection disconnection configuration information.

18. A non-transitory computer readable storage medium, storing a computer program thereon, wherein the computer program, when executed by a processor, causes the processor to:
  acquire scheduling configuration information, wherein the scheduling configuration information indicates a traffic scheduling strategy for a target domain name, wherein the scheduling configuration information comprises a domain name group and a condition group corresponding to the domain name group, wherein the domain name group comprises at least one domain name that pertains to a same service type, and the condition group comprises at least one traffic scheduling strategy associated with the domain name in the domain name group;
  modify the target domain name into a standardized domain name matching the traffic scheduling strategy, in a preset domain naming manner, wherein the standardized domain name at least comprises a computer room identifier used to indicate a target computer room after traffic scheduling; and
  initiate an access request to the target computer room, based on the standardized domain name.

* * * * *